US009794772B2

(12) United States Patent
Chandramouli et al.

(10) Patent No.: US 9,794,772 B2
(45) Date of Patent: Oct. 17, 2017

(54) MACHINE TYPE COMMUNICATION INTERWORKING FUNCTION

(71) Applicant: NOKIA SOLUTIONS AND NETWORKS OY, Espoo (FI)

(72) Inventors: Devaki Chandramouli, Plano, TX (US); Rainer Liebhart, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/409,226

(22) PCT Filed: May 30, 2013

(86) PCT No.: PCT/EP2013/061142
§ 371 (c)(1),
(2) Date: Dec. 18, 2014

(87) PCT Pub. No.: WO2013/189708
PCT Pub. Date: Dec. 27, 2013

(65) Prior Publication Data
US 2015/0172909 A1 Jun. 18, 2015

(30) Foreign Application Priority Data

Jun. 22, 2012 (WO) ................ PCT/US2012/043762

(51) Int. Cl.
*H04W 8/10* (2009.01)
*H04W 4/00* (2009.01)
(52) U.S. Cl.
CPC ............ *H04W 8/10* (2013.01); *H04W 4/005* (2013.01)

(58) Field of Classification Search
CPC ........................................................ H04W 8/10
USPC ........................................................ 455/433
See application file for complete search history.

(56) References Cited

U.S. PATENT DOCUMENTS

2013/0115983 A1* 5/2013 Ronneke ................ H04L 51/38
455/466

OTHER PUBLICATIONS

3GPP TS 23.060 V10.7.0 (Mar. 2012); 3rd Generation Partnership Project; Technical Specification Group Services and System Aspects; General Packet Radio Service (GPRS); Service description; Stage 2 (Release 10).
3GPP TS 23.228 V11.4.0 (Mar. 2012); 3rd Generation Partnership Project; Technical Specification Group Services and System Aspects; IP Multimedia Subsystem (IMS); Stage 2 (Release 11).
(Continued)

*Primary Examiner* — Christopher M Brandt
(74) *Attorney, Agent, or Firm* — Squire Patton Boggs (US) LLP

(57) ABSTRACT

Communication systems, such as an evolved packet system, may benefit from various interworking functions. In particular, certain communication systems in which machine type communication devices are deployed may benefit from a machine type communication interworking function in a visited network. A method may comprise receiving, from a network element, a request in a visited machine type communication interworking function. The method may also comprise processing the request in the visited machine type communication interworking function. The method may further comprise sending a response to the network element in response to the request.

19 Claims, 13 Drawing Sheets

(56) References Cited

OTHER PUBLICATIONS

3GPP TS 23.401 V11.1.0 (Mar. 2012); 3rd Generation Partnership Project; Technical Specification Group Services and System Aspects; General Packet Radio Service (GPRS) enhancements for Evolved Universal Terrestrial Radio Access Network (E-UTRAN) access (Release 11).

3GPP TS 23.682 V11.0.0 (Mar. 2012); 3rd Generation Partnership Project; Technical Specification Group Services and System Aspects; Architecture enhancements to facilitate communications with packet data networks and applications (Release 11).

International Search Report & Written Opinion dated Oct. 28, 2013 corresponding to International Patent Application No. PCT/EP2013/061142.

Nokia Siemens Networks et al., "Roaming architecture for device triggering," 3GPP Draft; S2-124472, SA WG2 Meeting #94, Nov. 12-16, 2012, New Orleans, USA, retrieved Nov. 6, 2012 from www.3gpp.org/ftp/tsg_sa/WG2_arch/TSGS2_94_New_Orleans/Docs/, XP050684119, 7 pages.

Nokia Siemens Networks et al., "Solution for T5 based device triggering," 3GPP Draft; S2-123259, SA WG2 Meeting #92, Jul. 9-13, 2012, Barcelona, Spain, retrieved Jul. 11, 2012, XP050633649, 4 pages.

Nokia Siemens Networks et al., "T5 based Device Triggering methods," 3GPP Draft; S2-120801_T5-Disc, 3GPP TSG SA WG2 Meeting #89, Feb. 6-10, 2012, Vancouver, Canada, retrieved Jan. 31, 2012, XP050576657, 6 pages.

3GPP TS 23.682 V11.1.0 (Jun. 2012), Technical Specification, 3rd Generation Partnership Project; Technical Specification Group Services and System Aspects; Architecture Enhancements to Facilitate Communications with Packet Data Networks and Applications (Release 11), Jun. 15, 2012, XP050580726, pp. 1-27.

\* cited by examiner

MACHINE TYPE COMMUNICATION INTERWORKING FUNCTION

BACKGROUND

Field

Communication systems, such as an evolved packet system, may benefit from various interworking functions. In particular, certain communication systems in which machine type communication devices are deployed may benefit from machine type communication interworking functions.

Description of the Related Art

The evolved packet system (EPS), the successor of general packet radio system (GPRS), provides radio interfaces and packet core network functions for broadband wireless data access. EPS core network functions may comprise the mobility management entity (MME), the packet data network gateway (PDN-GW) and the Serving Gateway (S-GW). An example of an evolved packet core architecture is illustrated in FIG. 1 and is described by third generation partnership project (3GPP) technical specification (TS) 23.401, which is incorporated herein by reference in its entirety. A common packet domain core network can be used for different radio access networks (RANs) types, like for example the global system for mobile communication (GSM) enhanced data rates for GSM evolution (EDGE) radio access network (GERAN) and the universal terrestrial radio access network (UTRAN).

For machine-type-communication (MTC) a functional entity called MTC interworking function (MTC-IWF) and several new interfaces, comprising S6m, Tsp, Tsms, T5a/b/c and T4, have been introduced to the 3GPP architecture. FIG. 2 illustrates machine-type-communication additions to the 3GPP architecture, as well as the various interfaces identified. The MTC-IWF and the new interfaces in 3GPP Release 11 (Rel 11) can, for example, enable triggering of devices with or without a mobile subscriber integrated services digital network number (MSISDN) from an internal or external MTC server. The triggering of the devices may be, for example, in order to establish a packet data network (PDN) connection and/or packet data protocol (PDP) context. A 3GPP architecture for machine-type communication is discussed in 3GPP TS 23.682, which incorporated herein by reference in its entirety.

Conventionally, a system can locate an interworking function in a home network (as shown in FIG. 2) and perform T5 based triggering as shown in the call flow in FIG. 3. In roaming scenarios this results in introduction of charging functionality in the MME to allow for inter-operator charging, possible security threats to the serving network nodes in the visited network and exposes the serving network topology to the outside world.

As shown in FIG. 3, at 1 a submit request can be received at a serving GPRS support node (SGSN)/MME/MSC from a MTC-IWF located in the home network. Charging data record (CDR) generation can occur in the SGSN/MME/MSC in the visited network. Then, at 2, a transfer trigger can arise. Therefore, at 3, the MTC-IWF can receive a delivery report from the SGSN/MME/MSC. After that, at 4, the MTC-IWF can register for UE reachability notification by contacting the home subscriber server (HSS) to provide store and forward functionality if there is a failure in trigger delivery.

"Device reachability" can be an important feature of 3GPP related to device triggering and specifically T5 based device triggering. MTC interworking function in the current architecture, however, is present in the home network, as shown in FIG. 2. Thus, there is a need to support charging functionality in the serving node (for example MME) to address inter-operator charging in case of roaming scenarios for T5 based triggering and other T5based features like small data transmission and monitoring to work.

Furthermore, because the trigger message and other downlink messages are sent directly from the MTC-IWF to the serving node (for example MME), a fake IWF could bombard the serving node (for example the MME) in the serving network with fake trigger messages. If the trigger message is based on mobile terminated short message service (MT-SMS), then the fake triggers can also be initiated by hackers using, for example, Internet, malicious applications, or the like. Moreover, the internal network topology has to be exposed for the MTC-IWF to deliver the trigger message directly to the correct serving nodes.

SUMMARY

According to a first embodiment, a method can comprise receiving, from a network element, a request in a visited machine type communication interworking function. The method can also comprise processing the request in the visited machine type communication interworking function. The method may further comprise sending a response to the network element in response to the request.

The processing may comprise querying a home subscriber server to obtain serving node information based on the request.

The processing also may comprise sending a submit request to a serving node based on the request and receiving a submit response from the serving node in response to the submit request.

The method may also comprise generating charging information in the visited machine type communication interworking function.

Moreover, the method may comprise performing at least one security check with respect to the request in the visited machine type communication interworking function.

Additionally, the method may comprise determining at least one serving node corresponding to a user equipment identified in the request, wherein the determining may comprise a domain name server query.

A method according to a second embodiment can comprise sending a request to a visited machine type communication interworking function from a home machine type communication interworking function. The method may also comprise receiving a response from the visited machine type communication interworking function in response to the request.

The method may further comprise receiving a machine type communication trigger request from a services capability server, wherein the sending the request is responsive to the machine type communication trigger request, and sending a machine type communication response in response to the machine type communication trigger request.

The method may also comprise determining the visited machine type communication interworking function based on at least one of a fully qualified domain name of a node currently serving a user equipment identified in the request, a fully qualified domain name of the visited machine type communication interworking function, or a pre-configured foreign domain visited machine type communication interworking function pair.

The method may also further comprise querying a home subscriber server based on the machine type communication request.

The method may additionally further comprise storing a mapping between an international mobile subscriber identity and an external identifier of a user equipment corresponding to the request.

According to a third embodiment, an apparatus can comprise receiving means for receiving, from a network element, a request in a visited machine type communication interworking function. The apparatus can also comprise processing means for processing the request in the visited machine type communication interworking function. The apparatus may further comprise sending means for sending a response to the network element in response to the request.

The apparatus may also comprise generating means for generating charging information in the visited machine type communication interworking function.

Moreover, the apparatus may comprise security means for performing at least one security check with respect to the request in the visited machine type communication interworking function.

Additionally, the apparatus may comprise determining means for determining at least one serving node corresponding to a user equipment identified in the request, wherein the determining may comprise a domain name server query.

The processing means may comprise querying means for querying a home subscriber server to obtain serving node information based on the request.

The processing means may also comprise transmission means for sending a submit request to a serving node based on the request and reception means for receiving a submit response from the serving node in response to the submit request.

An apparatus according to a fourth embodiment can comprise sending means for sending a request to a visited machine type communication interworking function from a home machine type communication interworking function. The apparatus may also comprise receiving means for receiving a response from the visited machine type communication interworking function in response to the request.

The apparatus may further comprise receiving means for receiving a machine type communication trigger request from a services capability server, wherein the sending the request is responsive to the machine type communication trigger request, and sending means for sending a machine type communication response in response to the machine type communication trigger request.

The apparatus may also comprise determining means for determining the visited machine type communication interworking function based on at least one of a fully qualified domain name of a node currently serving a user equipment identified in the request, a fully qualified domain name of the visited machine type communication interworking function, or a pre-configured foreign domain visited machine type communication interworking function pair.

The apparatus may also further comprise querying means for querying a home subscriber server based on the machine type communication request.

The apparatus may additionally further comprise storing means for storing a mapping between an international mobile subscriber identity and an external identifier of a user equipment corresponding to the request.

An apparatus, according to a fifth embodiment can comprise at least one processor and at least one memory comprising computer program code. The at least one memory and the computer program code can be configured to, with the at least one processor, cause the apparatus at least to receive, from a network element, a request in a visited machine type communication interworking function. The at least one memory and the computer program code can also be configured to, with the at least one processor, cause the apparatus at least to process the request in the visited machine type communication interworking function. The at least one memory and the computer program code may further be configured to, with the at least one processor, cause the apparatus at least to send a response to the network element in response to the request.

The at least one memory and the computer program code may further be configured to, with the at least one processor, cause the apparatus at least to generate charging information in the visited machine type communication interworking function.

The at least one memory and the computer program code may also be configured to, with the at least one processor, cause the apparatus at least to perform at least one security check with respect to the request in the visited machine type communication interworking function.

The at least one memory and the computer program code may additionally be configured to, with the at least one processor, cause the apparatus at least to determine at least one serving node corresponding to a user equipment identified in the request, wherein the determining may comprise a domain name server query.

The at least one memory and the computer program code may be configured to, with the at least one processor, cause the apparatus at least to process the request by querying a home subscriber server to obtain serving node information based on the request.

The at least one memory and the computer program code may be configured to, with the at least one processor, cause the apparatus at least to process the request by sending a submit request to a serving node based on the request and receiving a submit response from the serving node in response to the submit request.

In a sixth embodiment, an apparatus can comprise at least one processor and at least one memory comprising computer program code. The at least one memory and the computer program code can be configured to, with the at least one processor, cause the apparatus at least to send request to a visited machine type communication interworking function from a home machine type communication interworking function. The at least one memory and the computer program code may also be configured to, with the at least one processor, cause the apparatus at least to receive a response from the visited machine type communication interworking function in response to the request.

The at least one memory and the computer program code may be configured to, with the at least one processor, cause the apparatus at least to receive a machine type communication trigger request from a services capability server. Moreover, the at least one memory and the computer program code may be configured to, with the at least one processor, cause the apparatus at least to send the request responsive to the machine type communication trigger request, and to send a machine type communication response in response to the machine type communication trigger request.

The at least one memory and the computer program code may be configured to, with the at least one processor, cause the apparatus at least to query a home subscriber server based on the machine type communication request.

The at least one memory and the computer program code may be configured to, with the at least one processor, cause the apparatus at least to store a mapping between an international mobile subscriber identity and an external identifier of a user equipment corresponding to the request.

The at least one memory and the computer program code may be configured to, with the at least one processor, cause the apparatus at least to determine the visited machine type communication interworking function based on at least one of a fully qualified domain name of a node currently serving a user equipment identified in the request, a fully qualified domain name of the visited machine type communication interworking function, or a pre-configured foreign domain visited machine type communication interworking function pair.

In a seventh embodiment, a system can comprise a home machine type communication interworking function comprising at least one first processor and at least one first memory comprising first computer program code, wherein the at least one first memory and the first computer program code are configured to, with the at least one first processor, cause the home machine type communication interworking function at least to send request to a visited machine type communication interworking function and may receive a response from the visited machine type communication interworking function in response to the request. The system can also comprise the visited machine type communication interwork function comprising at least one second processor and at least one second memory comprising second computer program code, wherein the at least one second memory and the second computer program code are configured to, with the at least one second processor, cause the visited machine type communication interwork function at least to receive, from the home machine type communication interworking function, the request, process the request, and may send the response to the home machine type communication interworking function in response to the request.

A computer program may, in several embodiments, comprise code for performing the method of the first and/or the second embodiment above when the computer program is run on a processor. The computer program may be a computer program product. A computer program product may, in several embodiments, comprise a computer readable medium encoded with instructions that, when executed in hardware, perform a process. The process may comprise the method of the first and/or the second embodiment above.

The apparatuses of the third and fifth embodiments can be a machine type communication interworking function configured as a visited machine type communication interworking function, while the apparatuses of the fourth and sixth embodiments can be a machine type communication interworking function configured as a home machine type communication interworking function.

In any of the above embodiments, the request may comprise at least one of a device trigger request, a monitoring request, or a small data transmission request.

BRIEF DESCRIPTION OF THE DRAWINGS

For proper understanding of the invention, reference should be made to the accompanying drawings, wherein.

DETAILED DESCRIPTION

The terms "device trigger request" and "device trigger response" used in the description are just examples for any "request" or "response" and shall be understood as non-limiting. Other examples for a "request" are a "monitoring request" or a "small data transmission request" or a "new request from home network".

Figure 1:
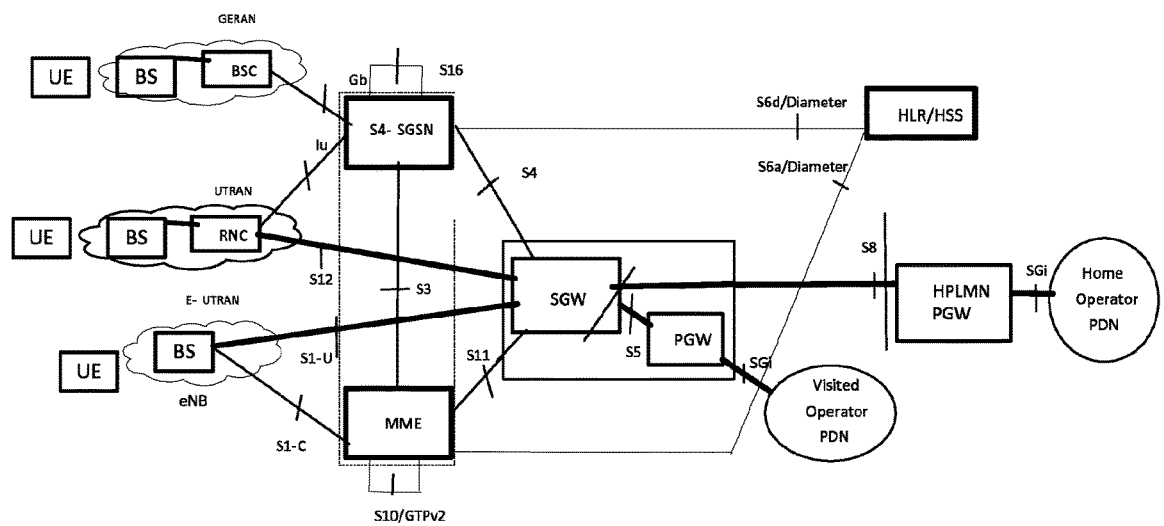
FIG. 1 illustrates an evolved packet core architecture.
Figure 2:
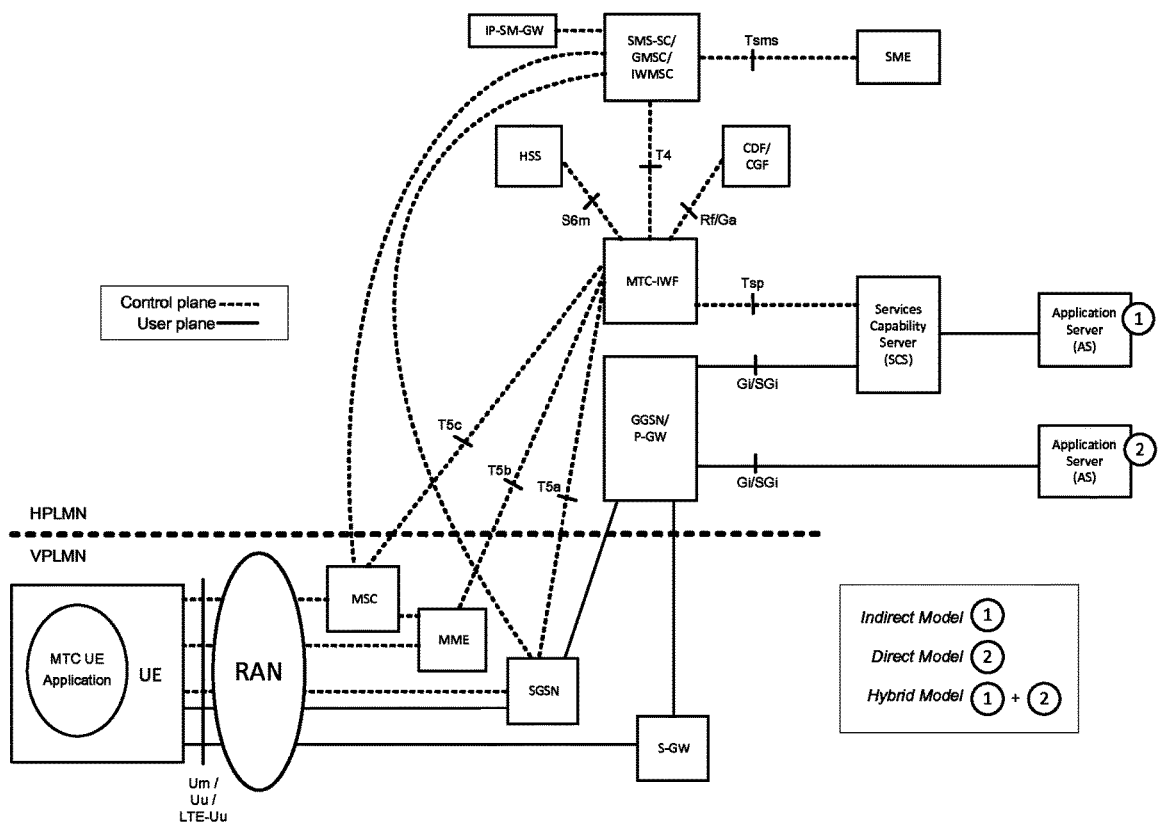
FIG. 2 illustrates machine-type-communication additions to a third generation partnership project architecture.
Figure 3:
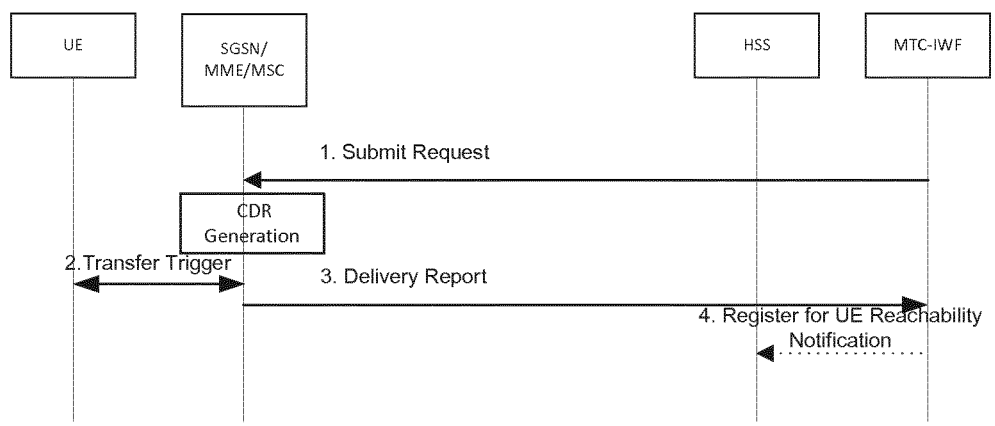
FIG. 3 illustrates a call flow of T5 based triggering.

Certain embodiments provide a machine type communication (MTC) interworking function in the visited network, namely a visited MTC interworking function (V-MTC-IWF) in roaming scenarios, and an interface (T11) between the home visited MTC interworking function (H-MTC-MWF) and V-MTC-IWFs. V-MTC-IWF will be used as a function to interwork between the H-MTC-IWF located in the home public land mobile network (H-PLMN) and the serving nodes (for example SGSN, MME or MSC) in the visited public land mobile network (V-PLMN). In the current architecture, MTC-IWF is placed in the home public land mobile network (H-PLMN, see FIG. 2) and it conventionally has to support charging functionality.

According to certain embodiments, an MTC-IWF can work in H-MTC-IWF and/or V-MTC-IWF mode, based on the actual situation. Thus the H-MTC-IWF and the V-MTC-IWF may be implemented in one network element (MTC-IWF), which may be configured to operate in H-MTC-IWF mode when it is located in the H-PLMN and in V-MTC-IWF mode when it is located in the V-PLMN. In other words, the same interworking function can serve as H-MTC-IWF with respect to home user equipment and as V-MTC-IWF with respect to visiting user equipment. This may permit the V-MTC-IWF to act as a gatekeeper in the V-PLMN. The MTC-IWF may support charging functionality, such as generation of charging records for certain trigger events, for home based subscribers. This charging functionality can be applied to inbound roamers as well, thus avoiding the need to introduce MTC specific charging in the serving nodes, for example the MME. Furthermore, local network topology can be hidden from outside world when V-MTC-IWF acts as an entry point to the network. V-MTC-IWF can also enhance security within the network, because the messages can be scrutinized/scanned by the V-MTC-IWF prior to forwarding it to the serving nodes (MME/SGSN/MSC) which keeps them safe from potential fake IWF in the home network sending messages.

Figure 4:
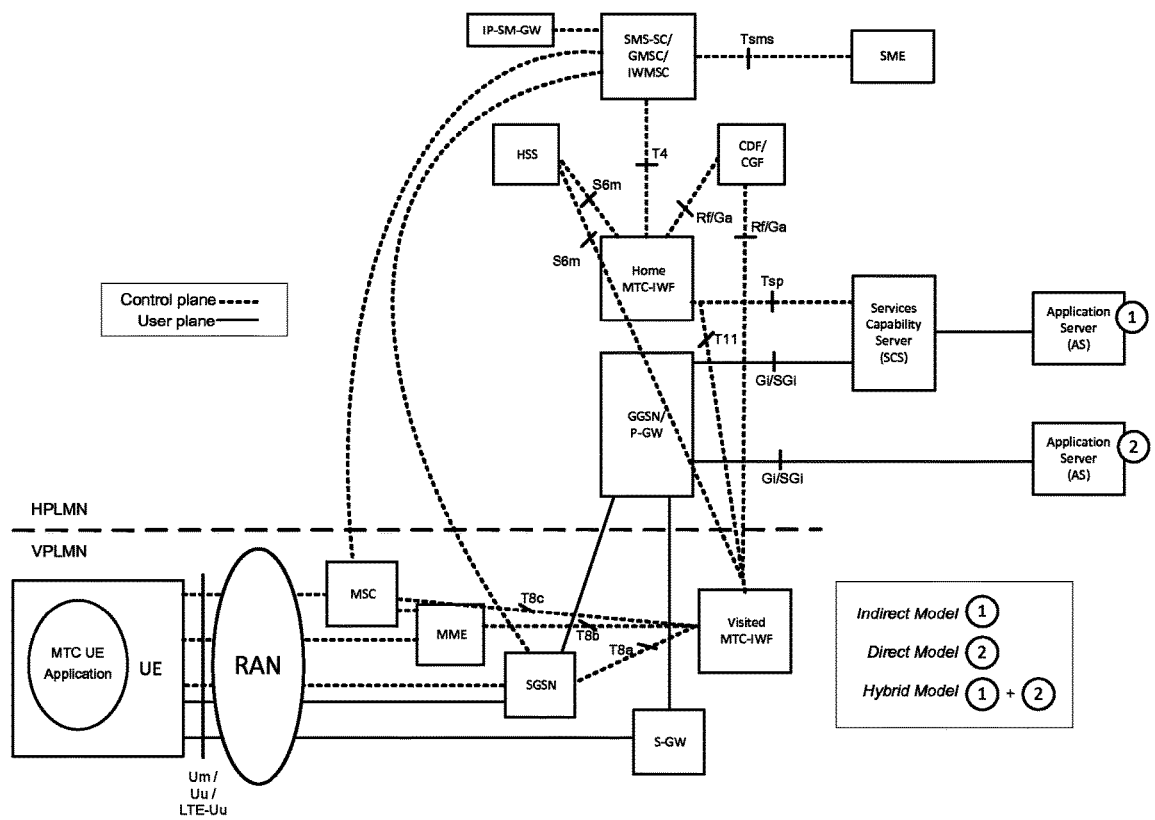
FIG. 4 illustrates an evolved architecture with Home MTC IWF and Visited MTC IWF, according to certain embodiments.

FIG. 4 illustrates an evolved architecture with H-MTC-IWF and V-MTC-IWF, according to certain embodiments. T11 is an interface between MTC-IWF in H-PLMN and MTC-IWF in V-PLMN, which can be respectively called H-MTC-IWF and V-MTC-IWF. The T11 interface, or reference point, can connect the H-MTC-IWF in the H-PLMN to the V-MTC-IWF in the V-PLMN, and support device trigger functionality or other functionalities. For example, T11 may support the transfer of requests, such as device trigger requests, small data transmission, and monitoring, from H-MTC-IWF in the H-PLMN to the V-MTC-IWF in the V-PLMN. Moreover, T11 can support reporting to H-MTC-IWF in the H-PLMN the success or failure of delivering a request to the UE and T11 can support providing V-PLMN congestion/load information to H-MTC-IWF in the H-PLMN.

T8a/T8b/T8c are interfaces or reference points between V-MTC-IWF and MME/SGSN/MSC in the V-PLMN. The T8a/T8b/T8c reference point(s) can serve as follows. T8a can connect the V-MTC-IWF in the V-PLMN to the serving SGSN; T8b can connect the V-MTC-IWF in the V-PLMN to the serving MME; T8c can connect the V-MTC-IWF in the V-PLMN to the serving MSC; and collectively T8a/T8b/T8c can support transfer of device trigger requests to the serving SGSN/MME/MSC in the V-PLMN and report to V-MTC-IWF in the V-PLMN the success or failure of delivering a device trigger to UE, as well as provide SGSN/MME/MSC congestion/load information to V-MTC-IWF in the VPLMN.

A UE capable of being directly triggered by a generic NAS transport message can report this capability as part of the UE capability when it registers with the network, such as by using an EPS Attach Request, Tracking Area Update Request, GPRS Attach Request and/or Routing Area Update Request. A serving node capable of direct triggering can provide an indication of the UE and serving node trigger capability to HSS, for example, in an Update Location request upon initial attach, TAU or RAU. The HSS can store and provide this information to indicate the UE and serving node(s)' trigger capability to the H-MTC-IWF or V-MTC-IWF.

In brief, the description of the MTC related reference points can be as follows: Tsms can be a reference point used by an entity outside the 3GPP network to communicate with UEs used for MTC via SMS; Tsp can be a reference point used by a SCS to communicate with the MTC-IWF related control plane signaling; T4 can be a reference point used by H-MTC-IWF to route device trigger to the SMS-SC in the H-PLMN; T5a can be a reference point used between H-MTC-IWF and serving SGSN in the H-PLMN; T5b can be a reference point used between H-MTC-IWF and serving MME in the H-PLMN; T5c can be a reference point used between H-MTC-IWF and serving MSC in the H-PLMN; T8a can be a reference point used between V-MTC-IWF and serving SGSN in the V-PLMN; T8b can be a reference point used between V-MTC-IWF and serving MME in the V-PLMN; T8c can be a reference point used between V-MTC-IWF and serving MSC in the H-PLMN; T11 can be a reference point used between H-MTC-IWF in the HPLMN and V-MTC-IWF in the VPLMN; and S6m can be a reference point used by the H-MTC-IWF and/or V-MTC-IWF to interrogate HSS/HLR.

Figure 5:
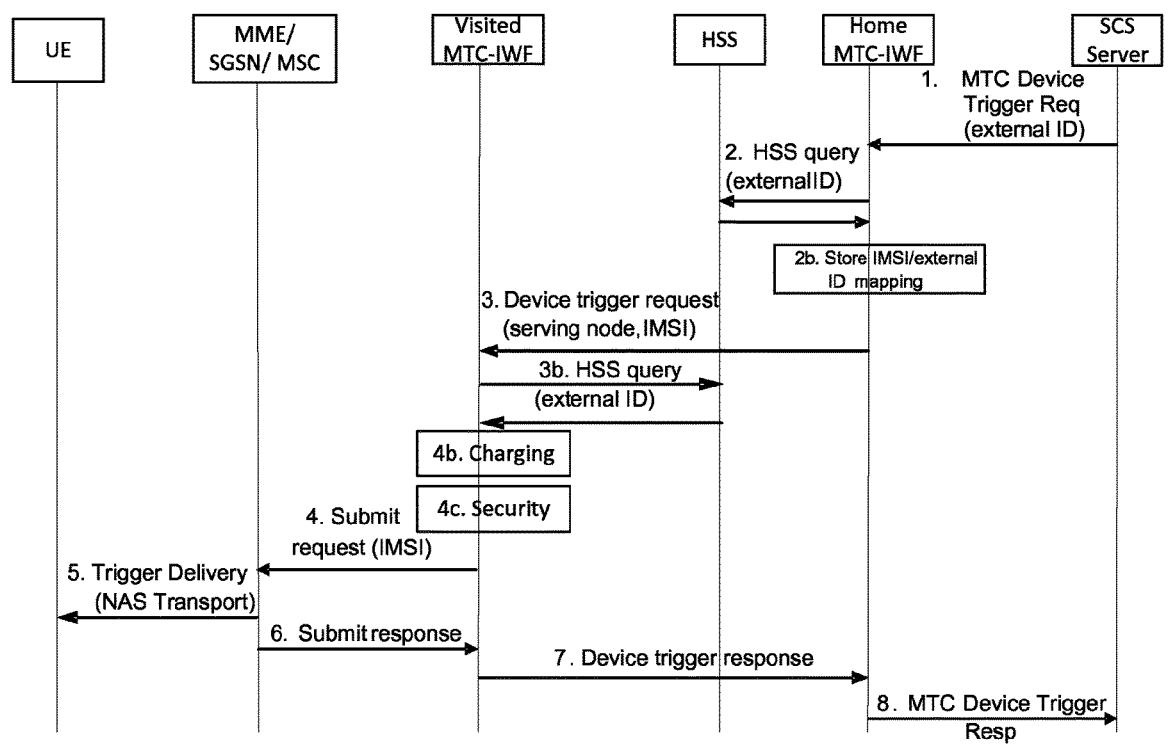
FIG. 5 illustrates a call flow for an evolved version of T5 based device triggering functionality in a roaming scenario, according to certain embodiments.

FIG. 5 illustrates a call flow for an evolved version of T5 based device triggering functionality in a roaming scenario, according to certain embodiments.

As shown in FIG. 5, at 1, the services capability server (SCS) can send a device trigger request with external identifier (NAI), message priority, single delivery attempt flag (optional), validity time (optional), request type (trigger application), application packet data unit (PDU) to the H-MTC-IWF.

Then, at 2, the H-MTC-IWF can send a query to the HSS to obtain international mobile subscriber identity (IMSI) and serving node (for example SGSN, MME or MSC) information. At 2b, the H-MTC-IWF can store the IMSI/external identifier (ID) mapping. There are different possible options for the HSS query. For example, in a first alternative, the HSS may return a fully qualified domain name (FQDN) of the node currently serving the UE, for example, the MME/SGSN/MSC located in H-PLMN or V-PLMN. The H-MTC-IWF can resolve this FQDN to an address, for example an internet protocol (IP) address. In a roaming case, the FQDN may be resolved in operator external domain name server (DNS) and can lead to the address, for example the IP address, of a V-MTC-IWF in a V-PLMN, while in a non-roaming case the FQDN can be resolved in an operator internal DNS to an address, for example an IP address, of a MME/SGSN/MSC located in the H-PLMN. The DNS query result may depend on the domain of the originator. Alternatively the H-MTC-IWF in H-PLMN can be configured with V-MTC-IWF addresses for each foreign domain (which is coded in the FQDN using MNC and MCC). H-MTC-IWF may route the message then onwards to V-MTC-IWF (roaming scenario, UE located in the V-PLMN) or MME/SGSN/MSC located in the H-PLMN (UE located in the H-PLMN). The device trigger request message sent to the V-MTC-IWF may contain the FQDN that was received from HSS (for example the FQDN of the serving node in the V-PLMN).

In a second alternative, in a roaming case, the HSS may return the FQDN of the V-MTC-IWF and the FQDN is resolved in the operator external DNS and leads to the address, for example the IP address, of a V-MTC-IWF in the V-PLMN. This may be based on an indication that the query is for routing a device trigger request from H-MTC-IWF. This is under the assumption that the V-MTC-IWF or MME/SGSN/MSC registers V-MTC-IWF with the HSS (when the user is roaming) for device trigger requests to be routed or HSS could be configured with the V-MTC-IWF. H-MTC-IWF in H-PLMN routes the message onwards to V-MTC-IWF. Note the H-MTC-IWF can determine that the user is roaming depending on the domain part in the FQDN.

In a third alternative, in a roaming case, the HSS may return the FQDN of the V-MTC-IWF along with the FQDN of the serving node(s). In this case, the V-MTC-IWF may be assumed to be registered with the HSS (when the user is roaming) for device trigger requests to be routed or HSS could be configured with the V-MTC-IWF. H-MTC-IWF determines that the user is roaming (as V-MTC-IWF FQDN is received along with serving node(s)) and the FQDN of the V-MTC-IWF is resolved in the operator external DNS and leads to the address, for example the IP address, of the V-MTC-IWF in the V-PLMN. H-MTC-IWF in H-PLMN routes the message onwards to V-MTC-IWF. The device trigger request message sent to the V-MTC-IWF may contain the FQDN for the serving node that was received from the HSS.

Based on H-MTC-IWF local policy and/or UE capabilities, H-MTC-IWF can determine the delivery route, for example direct T5 based trigger using generic format as opposed to T4 based trigger using MT-SMS. The following steps are premised on the idea that the H-MTC-IWF has chosen T5 based triggering using generic format, although such a choice is not mandatory.

At 3, the V-MTC-IWF can receive a device trigger request. Upon receiving the device trigger request, the V-MTC-IWF in the V-PLMN may, at 4b, generate a charging ticket for inter-operator charging purposes and may check the validity of the trigger message at 4c before forwarding it at 4. This may be performed in various ways, depending on whether the device trigger request comprises the serving node FQDN or not.

For example, if the device trigger request comprises the serving node FQDN, the V-MTC-IWF may resolve the received serving node information, such as the serving node FQDN, for example in operator internal DNS to for example a serving MME/SGSN/MSC address and can route the device trigger request onwards to this MME/SGSN/MSC. Alternatively the resolving of the serving node information may be also done by pre-configuring FQDN—server node address mapping information in the V-MTC-IWF, or by using any other know mechanism how to resolve a name to address mapping. Furthermore, the V-MTC-IWF can use the UE capabilities and serving core network (CN) node(s) capabilities retrieved from the HSS to select a suitable serving CN node (for example SGSN, MME or MSC) capable of triggering in a generic format. The V-MTC-IWF may send a Submit Request to the serving CN node. This might involve sequential or parallel delivery attempts in SGSN, MSC and/or MME. The Submit Request may comprise IMSI, message priority, V-MTC-IWF ID, reference number, single delivery attempt flag (optional), validity time (optional), request type (trigger application), and application PDU.

If the device trigger request does not comprise the serving node FQDN, V-MTC-IWF can, at 3b, send a query to the HSS to obtain serving node (MME/SGSN/MSC) information. The V-MTC-IWF uses the serving node information to route the device trigger request. Furthermore, the V-MTC-IWF can use the UE capabilities and serving CN node(s) capabilities retrieved from the HSS to select a suitable serving CN node capable of triggering in a generic format.

At 4, the V-MTC-IWF can send a Submit Request, as described above, to the serving CN node. This might involve sequential or parallel delivery attempts in SGSN, MSC and/or MME.

At 5, the serving CN node can indicate the Request type (trigger application) in the container type, application PDU in a generic container, MTC-IWF ID, and reference number within the NAS message, and can deliver it to the UE. The UE can provide the contents of the generic container and the container type to the corresponding application. If the UE is in idle mode, the serving CN node may page the UE prior to sending a NAS message for delivering the trigger. The UE responds with the delivery status (cause), MTC-IWF ID, Reference number, Response type (trigger application) in the container type, and optionally, application PDN in a generic container.

At 6, the serving CN node sends a Delivery Report (Cause, reference number, Response type (trigger application) in the container type, and if received, application PDN in a generic container) to the V-MTC-IWF. Cause may indicate whether the Trigger-Message was successfully delivered to the UE or reason for failure.

If the Trigger-Message cannot be delivered and the validity period indicates that this is not requesting only a single delivery attempt, the V-MTC-IWF can register with the HSS for UE reachability notification. For UE reachability notification procedure offered by MME, refer to 3GPP TS 23.401, section 5.3.11. For UE reachability notification procedure offered by SGSN, refer to 3GPP TS 23.060, section 5.3.10. Both sections are hereby incorporated herein by reference. When the V-MTC-IWF is notified of UE reachability, it may re-attempt to deliver the trigger request.

At 7, the V-MTC-IWF can provide a device trigger response (containing, for example, Cause, reference number, Response type (trigger application) in the container type, and if received, application PDN in a generic container) to the H-MTC-IWF. In turn, at 8, the H-MTC-IWF can provide a device trigger response to the SCS server. The response may be similar to the device trigger response sent to the H-MTC-IWF.

Co-existence of T4 and T5 based triggering with V-MTC-IWF is possible. With a T4 based trigger approach specified in TS 23.682, IWF in the home network obtains the FQDN of the serving node from the HSS and sends a submit trigger message with the FQDN of the serving node obtained from the HSS.

Figure 11:
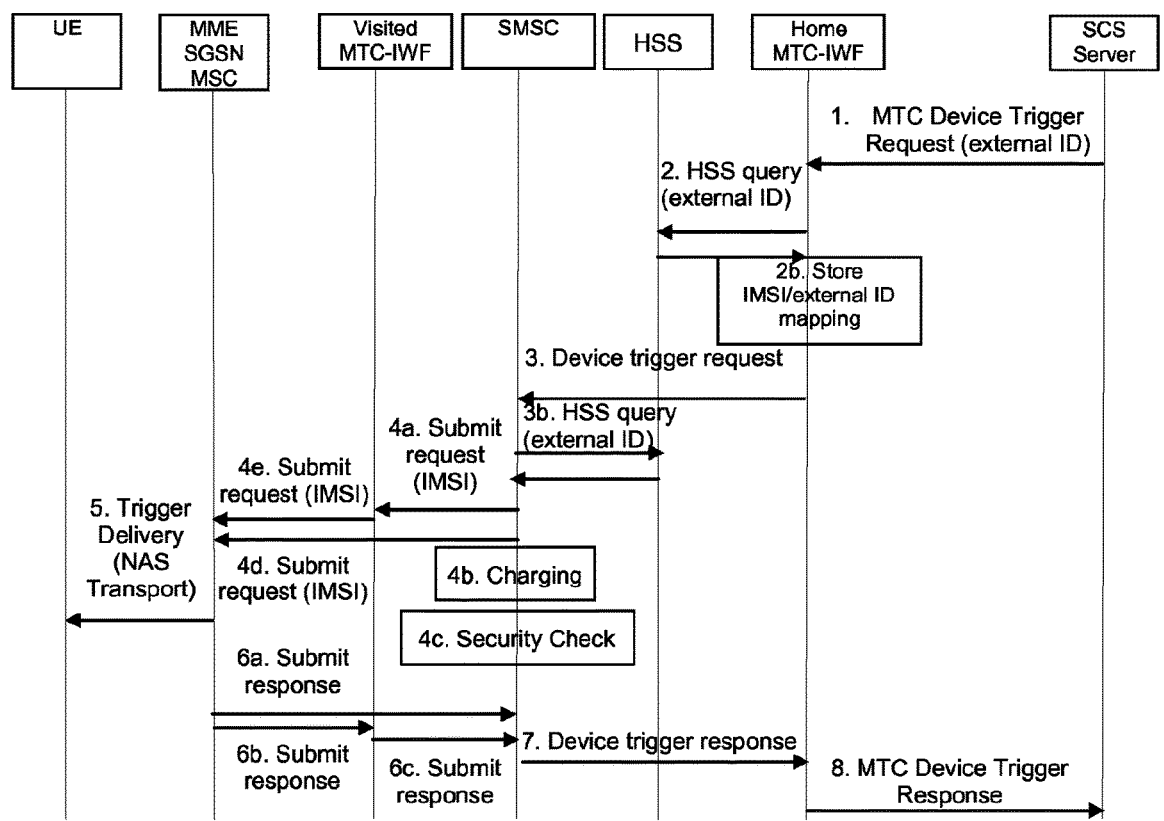
FIG. 11 illustrates a call flow for an evolved version of T5 based device triggering functionality in a roaming scenario, according to certain embodiments.

In case of roaming scenarios, when V-MTC-IWF exists in the network, co-existence of T4 and T5 based approach could depend on the result of HSS query at 2 in FIG. 5. Assuming the same alternatives as described for 2 above, for brevity, the following as illustrated in FIG. 11, may be the possible outcomes.

In a first case, the HSS may return at 2 an FQDN of the node currently serving the UE, such as the MME/SGSN/MSC located in H-PLMN or V-PLMN. The H-MTC-IWF may add, to the device trigger message to the SMSC at 3, the FQDN of the node currently serving the UE. To ensure backward compatibility, an external DNS query (not shown) using FQDN of the serving node(s) from SMSC may result in an address(es) (for example an IP address) of the serving nodes, for example, MME/SGSN/MSC. This may be ensured either by configuring the DNS server to respond depending on the originator of the query or by virtually configuring different DNS servers for the query. The SMSC may send a submit request directly to the serving node(s) at 4d for submitting MT-SMS.

In a second case, for example in roaming scenarios, the HSS may return at 2 the FQDN of the V-MTC-IWF. The H-MTC-IWF may add this in the device trigger request message sent, at 3, to the SMSC. An external DNS query (not shown) using the FQDN of the V-MTC-IWF may result in the address (for example the IP address) of the V-PLMN. The SMSC may send a submit request to the V-MTC-IWF, at 4a, for submitting the MT-SMS.

In a third case, for example in roaming scenarios, the HSS may return the FQDN of the V-MTC-IWF along with the FQDN of the serving node at 2. With this result, the H-MTC-IWF may add both the FQDN of the V-MTC-IWF and the serving node(s), only the FQDN of the serving node(s) or only the FQDN of the V-MTC-IWF in the device trigger request message sent to the SMSC at 3. Depending on the parameter and operator policies, SMSC may route the message either via serving node(s), at 4d, or via V-MTC-IWF, at 4a.

In all three cases described above, the SMSC determines whether HSS query (for example, step 3b) is needed or not based on the parameters of the device trigger request. HSS query 3b may be performed if the device trigger request does not comprise FQDN of the serving node. If SMSC performs HSS query 3b, then the HSS may return any of the possible values: FQDN of the current serving node, or FQDN of V-MTC-IWF, or FQDN of V-MTC-IWF and FQDN of the current serving node. Depending on the outcome, SMSC can decide how the request should be routed either via serving node or via V-MTC-IWF.

If the SMSC routes the trigger message via V-MTC-IWF, it may be beneficial for security protection. The V-MTC- IWF may filter at 4c the MT-SMS based on a "black list" and/or "white list" of SMSCs when home routing is not supported. This may help to avoid implementing the same filtering functionality in all the serving nodes, for example MME, SGSN and MSC. Furthermore, this may protect the packet core network from overload due to fake trigger SMS requests and may protect the devices from fake trigger SMS, which in turn can affect their battery life negatively.

Various benefits may arise from the use of V-MTC-IWF and the related procedures. For example, the V-MTC-IWF may act as an entry point and/or gate keeper for the visited network and the internal network topology can be hidden from the outside world. The MTC-IWF charging functionality may be re-used in roaming scenarios, and thus can avoid the need to introduce such charging functionality in the serving nodes, while facilitating inter-operator charging requirements.

Moreover, certain embodiments may provide enhanced security by scrutinizing/scanning the incoming signaling traffic prior to overloading the packet core network. Furthermore, certain embodiments may also help filter MT-SMS based on black list and/or white list of SMSC(s) thus it can help to prevent overload in the network and save battery life for the devices.

The approach described can be applied to various combinations. For example, the approach can be applied to GPRS, universal mobile telecommunication system (UMTS), and EPS.

A V-MTC-IWF according to certain embodiments may have various characteristics and can be employed in a variety of ways and architectures. For example, to avoid exposing internal topology of visited network, one or more instances of an MTC-IWF, acting as V-MTC-IWF(s), may reside in the VPLMN. An MTC-IWF can be a standalone entity or a functional entity of another network element. The V-MTC-IWF can hide the internal PLMN topology of a visited network in roaming scenarios, and can relay the request from H-MTC-IWF to serving nodes (MME, SGSN, MSC) in the visited network.

The functionality of the MTC-IWF in the VPLMN, also referred to as the V-MTC-IWF, may comprise terminating the T8a, T8b, T8c, T4, T11 and Rf/Ga reference points and supporting the ability to authorize the H-MTC-IWF (and SMSC) before communication establishment with the 3GPP network. The V-MTC-IWF may also support the ability to authorize control plane requests from an H-MTC-IWF (and SMSC) and various device trigger functionality. For example, the V-MTC-IWF may support reception of a device trigger request from H-MTC-IWF, reporting to the H-MTC-IWF the acceptance or non-acceptance of the device trigger request, and reporting to the H-MTC-IWF the success or failure of a device trigger delivery. The V-MTC-IWF may apply MTC-IWF and/or SGSN/MME/MSC induced congestion/load control as part of the response to trigger requests and may assign appropriate identifier (for example, port address number) to allow the UE to distinguish an MT message carrying device triggering information from any other type of messages.

The V-MTC-IWF may have an HSS resolution mechanism for use when multiple and separately addressable HSSs have been deployed by the network operator. See, for example, the SLF/Diameter Proxy agent specified in clause 5.8 of 3GPP TS 23.228, which is incorporated herein by reference. The V-MTC-IWF may also support interrogation of the appropriate HSS, when needed for device triggering, to map E.164 MSISDN or external identifier to IMSI of the associated UE, retrieve serving node information for the UE (for example, serving SGSN/MME/MSC address), and determine if a SCS is allowed to send a device trigger to a particular UE.

The V-MTC-IWF may perform protocol translation, if necessary, and forwarding towards the relevant network entity (for example, serving SGSN/MME/MSC or SMS-SC inside HPLMN domain) of a device trigger request to match the selected trigger delivery mechanism. The V-MTC-IWF may also support generation of device trigger CDRs with External Identifier and SCS Identifier and forwarding to CDF/CGF over an instance of Rf/Ga. CDR generation with or without a device trigger indication by other network entities is not precluded by CDR generation by the MTC-IWF.

The V-MTC-IWF may support ability for secure communications between the 3GPP network and the SCS. Moreover, the characteristics of the MTC-IWF may comprise the following: multiple V-MTC-IWFs can be used with a VPLMN and the system may be robust to single V-MTC-IWF failure.

Figure 6:
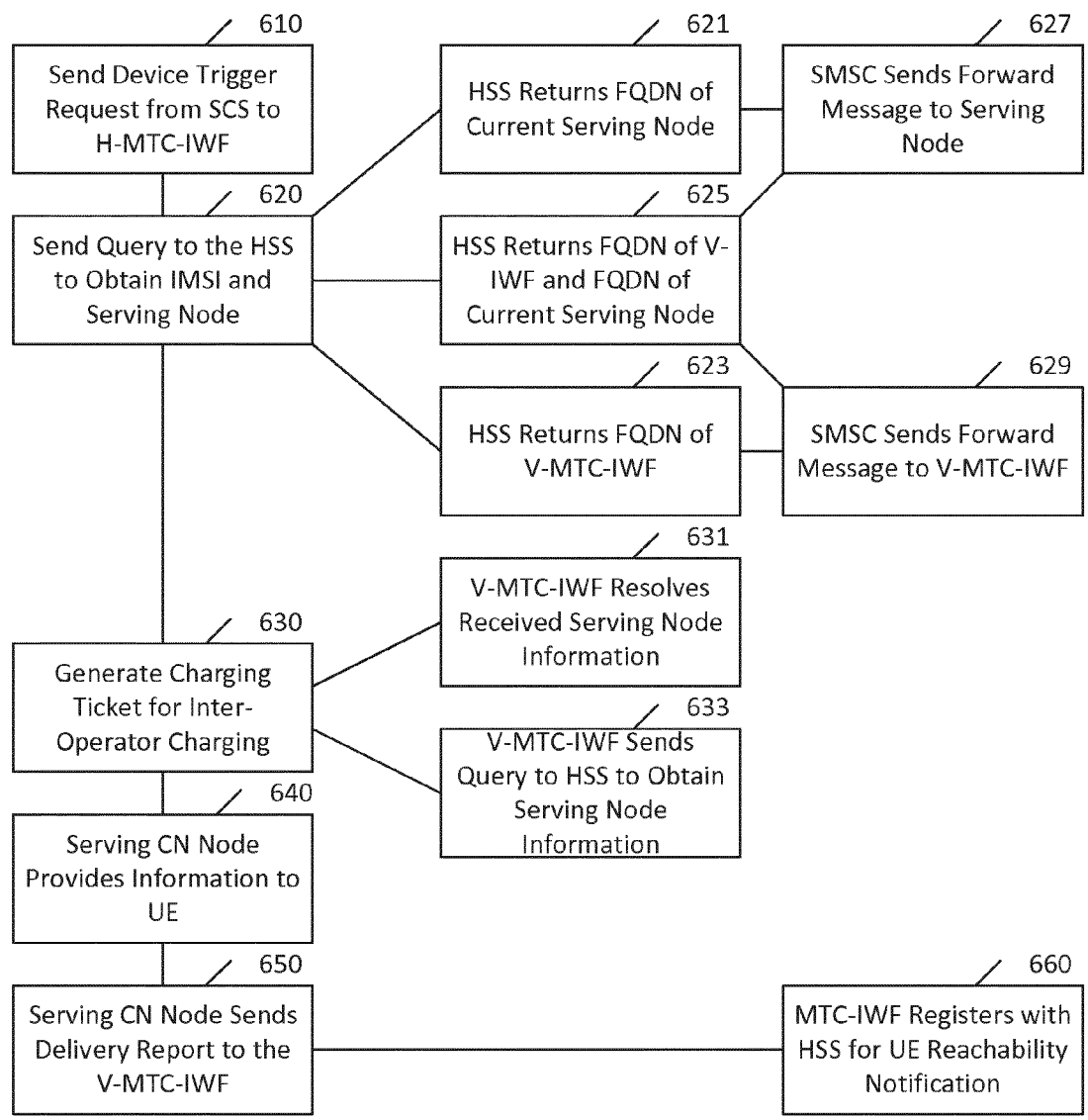
FIG. 6 illustrates a method according to certain embodiments.

FIG. 6 illustrates a method according to certain embodiments. As shown in FIG. 6, the method may comprise, at 610, sending a device trigger request from a services capability server to H-MTC-IWF and receiving the device trigger request from the services capability server. The sending the device trigger request may be responsive to the device trigger request. The method may also comprise sending a machine type communication device trigger response in response to the machine type communication trigger request.

The method may comprise, at 620, querying a home subscriber server based on the machine type communication device trigger request. The home subscriber server can, at 621, may return a fully qualified domain name of a current serving node. Alternatively, the home subscriber server may, at 623, return the fully qualified domain name of a visited machine type communication interworking function. In a further alternative, the home subscriber server may, at 625, return the fully qualified domain name of the visited machine type communication interworking function and the serving node. The method may also comprise storing a mapping between an international mobile subscriber identity and an external identifier of a user equipment corresponding to the device trigger request.

Depending on the steps at 621, 623, and 635, the method may comprise, at 627, an SMSC sending forward a message to the serving node. The method may alternative comprise, at 629, the SMSC sending a device trigger request to the V-MTC-IWF.

The method may further comprise, at 630, generating a charging ticket for inter-operator charging in the V-MTC-IWF. For example, at 631 the method may comprise the V-MTC-IWF resolving received serving node information. Alternatively, at 633, the V-MTC-IWF may query a home subscriber server to obtain serving node information.

At 640, the serving core network node may provide information to the user equipment. Then, at 650, the serving core network node may send a delivery report to V-MTC-IWF. Finally, at 660, under appropriate conditions as described above, the V-MTC-IWF can register with the home subscriber server for user equipment reachability notification to support store and forward functionality if the device trigger delivery failed.

Figure 7:
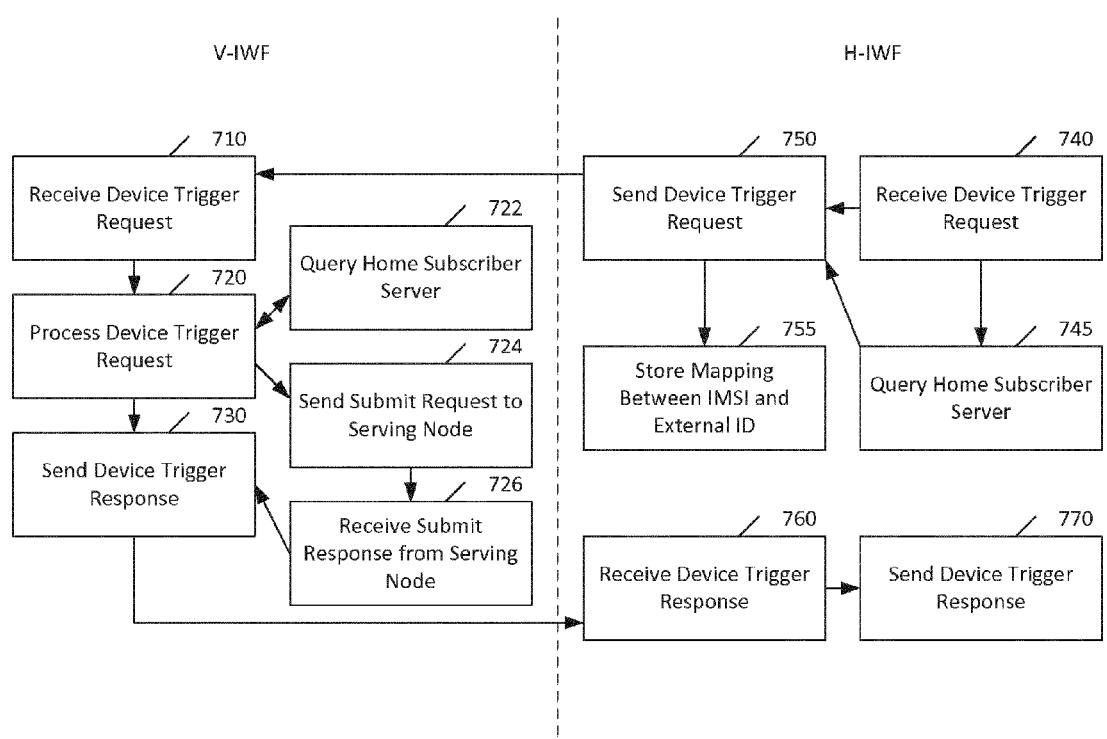
FIG. 7 illustrates another method according to certain embodiments.

FIG. 7 illustrates another method according to certain embodiments. As shown in FIG. 7, a method may comprise, at 710, receiving, from a network element, a device trigger request in a visited machine type communication interworking function. The method may also comprise, at 720, processing the device trigger request in the visited machine type communication interworking function. The method may further comprise, at 730, sending a device trigger response to the network element in response to the device trigger request.

The processing may comprise, at 722, querying a home subscriber server to obtain serving node information based on the device trigger request. The processing may also comprise, at 724, sending a submit request to a serving node based on the device trigger request and, at 726, receiving a submit response from the serving node in response to the submit request.

The method may also comprise, at 750, sending a device trigger request to a visited machine type communication interworking function from a home machine type communication interworking function. The method may further comprise, at 760, receiving a device trigger response from the visited machine type communication interworking function in response to the device trigger request.

The method can moreover comprise, at 740, receiving a device trigger request from a services capability server, wherein the sending the device trigger request may be responsive to the machine type communication trigger request, and, at 770, sending a device trigger response in response to the device trigger request.

The method may also comprise, at 745, querying a home subscriber server based on the device trigger request. Moreover, the method may comprise, at 755, storing a mapping between an international mobile subscriber identity and an external identifier of a user equipment corresponding to the device trigger request.

Figure 8:
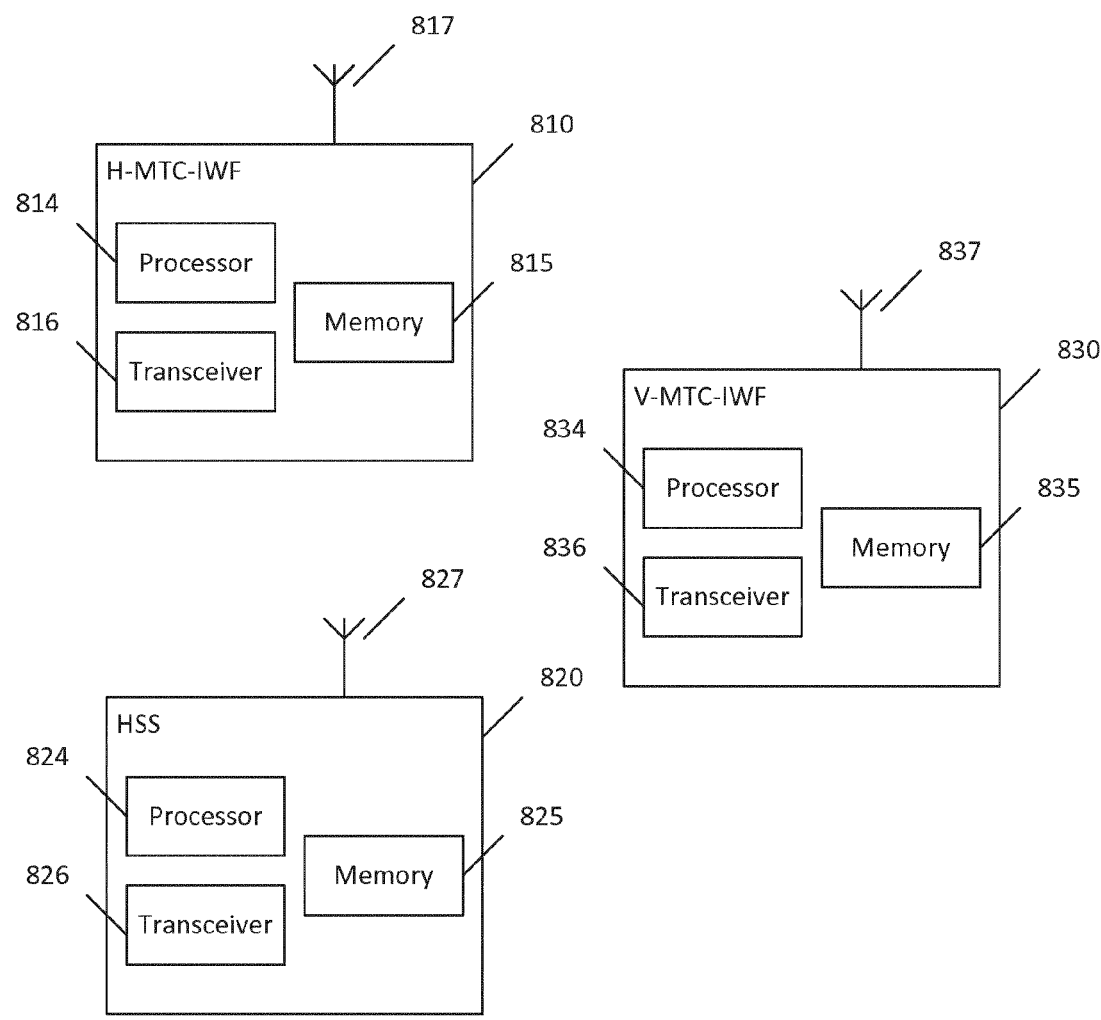
FIG. 8 illustrates a system according to certain embodiments.

FIG. 8 illustrates a system according to certain embodiments of the invention. In one embodiment, a system may comprise multiple devices, such as, for example, H-MTC-IWF 810, HSS 820, and V-MTC-IWF 830. Each of these devices may comprise at least one processor, respectively indicated as 814, 824, and 834. At least one memory may be provided in each device, and indicated as 815, 825, and 835, respectively. The memory may comprise computer program instructions or computer code contained therein. Transceivers 816, 826, and 836 are provided, and each device may also comprise an antenna, respectively illustrated as 817, 827, and 837. Other configurations of these devices, for example, may be provided. For example, H-MTC-IWF 810, HSS 820, and V-MTC-IWF 830 may be configured for wired communication, rather than wireless communication, and in such a case antennas 817, 827, and 837 would illustrate any form of communication hardware, without requiring a conventional antenna.

Transceivers 816, 826, and 836 may each, independently, be a transmitter, a receiver, or both a transmitter and a receiver, or a unit or device that is configured both for transmission and reception.

Processors 814, 824, and 834 may be embodied by any computational or data processing device, such as a central processing unit (CPU), application specific integrated circuit (ASIC), or comparable device. The processors may be implemented as a single controller, or a plurality of controllers or processors.

Memories 815, 825, and 835 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions stored in the memory and which may be processed by the processors may be any suitable form of computer program code, for example, a compiled or interpreted computer program written in any suitable programming language.

The memory and the computer program instructions may be configured, with the processor for the particular device, to cause a hardware apparatus such as H-MTC-IWF 810, HSS 820, and V-MTC-IWF 830, to perform any of the processes described above (see, for example, FIGS. 5-7, 9A, 9B, 10, and 11). Therefore, in certain embodiments, a non-transitory computer-readable medium may be encoded with computer instructions that, when executed in hardware, perform a process such as one of the processes described herein. Alternatively, certain embodiments of the invention may be performed entirely in hardware.

Furthermore, although FIG. 8 illustrates a system comprising a H-MTC-IWF, HSS, and V-MTC-IWF, embodiments of the invention may be applicable to other configurations, and configurations involving additional elements, as illustrated herein, for example in FIGS. 4 and 5.

Figure 12:
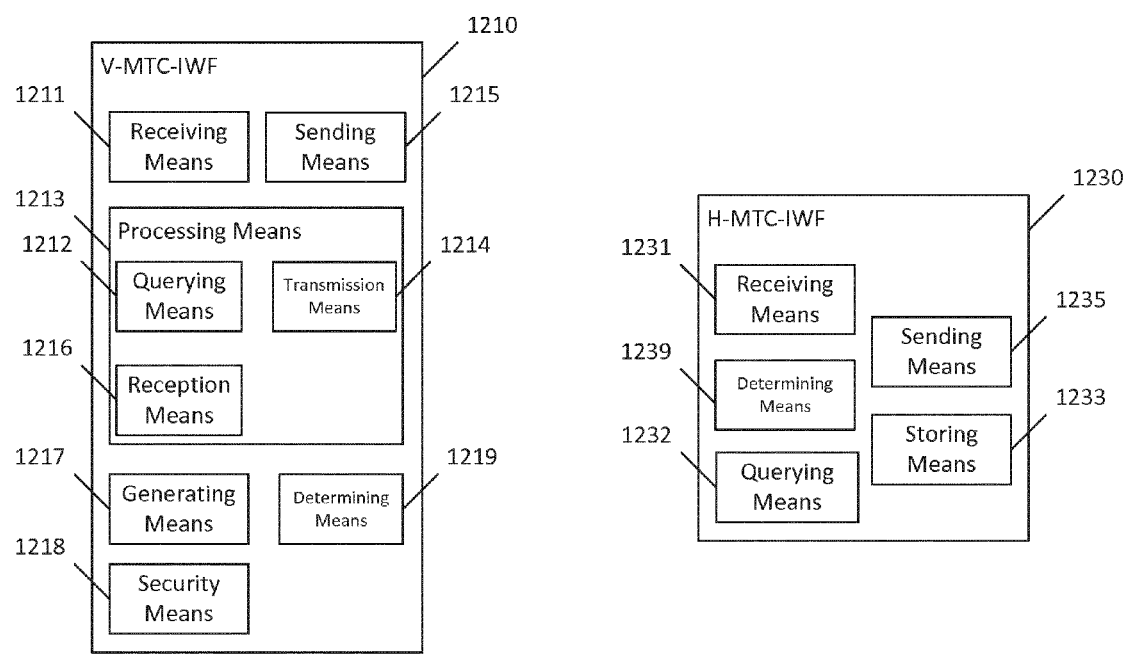
FIG. 12 illustrates another system according to certain embodiments.

FIG. 12 illustrates another system according to certain embodiments. As shown in FIG. 12, an apparatus, such as a V-MTC-IWF 1210, may comprise receiving means 1211 for receiving, from a network element, a request. The V-MTC-IWF 1210 may also comprise processing means 1213 for processing the request in the visited machine type communication interworking function. The apparatus may further comprise sending means 1215 for sending a response to the network element in response to the request.

The processing means 1213 may comprise querying means 1212 for querying a home subscriber server to obtain serving node information based on the request.

The processing means 1213 may also comprise transmission means 1214 for sending a submit request to a serving node based on the request and reception means 1216 for receiving a submit response from the serving node in response to the submit request.

The apparatus may also comprise generating means 1217 for generating charging information in the visited machine type communication interworking function.

Moreover, the V-MTC-IWF 1210 may comprise security means 1218 for performing at least one security check with respect to the request in the visited machine type communication interworking function.

Additionally, the V-MTC-IWF 1210 may comprise determining means 1219 for determining at least one serving node corresponding to a user equipment identified in the request, wherein the determining may comprises a domain name server query.

The system may also include another apparatus, for example H-MTC-IWF 1230. The H-MTC-IWF 1230 may comprise sending means 1235 for sending a request to a visited machine type communication interworking function from a home machine type communication interworking function. The H-MTC-IWF 1230 may also comprise receiving means 1231 for receiving a response from the visited machine type communication interworking function in response to the request.

The receiving means 1231 may further be for receiving a machine type communication trigger request from a services capability server, wherein the sending the request may be responsive to the machine type communication trigger request, and the sending means 1335 may further be for sending a machine type communication response in response to the machine type communication trigger request.

The H-MTC-IWF 1230 may also comprise determining means 1239 for determining the visited machine type communication interworking function based on at least one of a fully qualified domain name of a node currently serving a user equipment identified in the request or a fully qualified domain name of the visited machine type communication interworking function. Alternatively the determining may be done by looking up the visited machine type communication interworking function from a list comprising "foreign domains"-"visited machine type communication interworking function" pairs, wherein the foreign domain is coded in the MNC and/or MCC being part of a fully qualified domain name.

The H-MTC-IWF 1230 may also further comprise querying means 1232 for querying a home subscriber server based on the machine type communication request.

The H-MTC-IWF 1230 may additionally further comprise storing means 1233 for storing a mapping between an international mobile subscriber identity and an external identifier of a user equipment corresponding to the request.

Although H-MTC-IWF 1230 and V-MTC-IWF 1210 are shown as separate devices, a single device may be configured to comprise all the means shown in each of the devices.

Figure 9A:
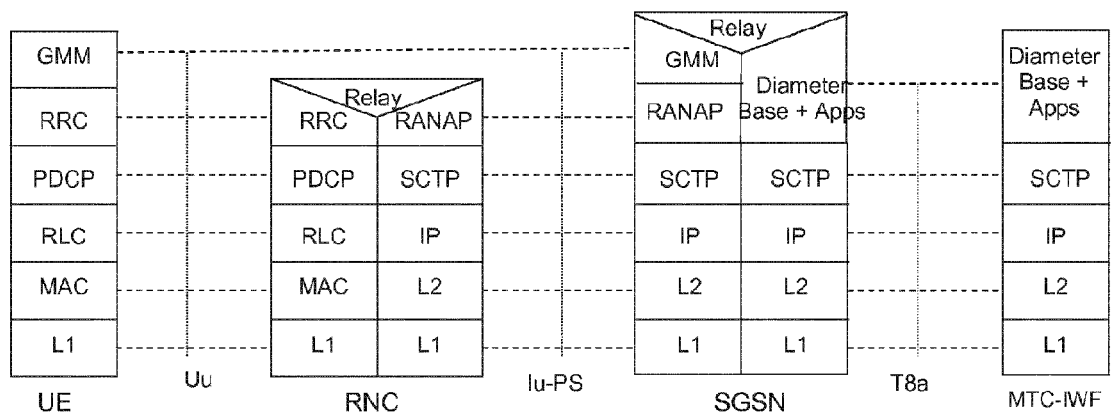
FIGS. 9A and 9B illustrate protocol layering according to certain embodiments.
Figure 9B:
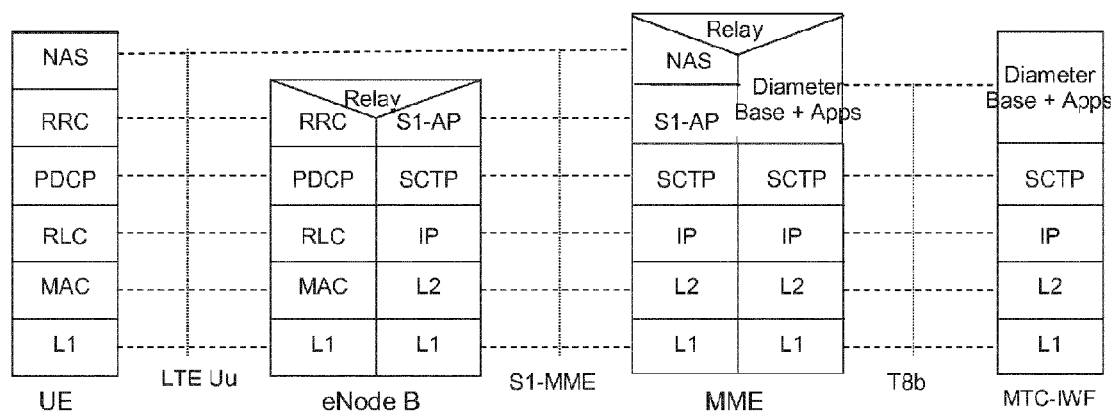

FIGS. 9A and 9B illustrate protocol layering according to certain embodiments. FIG. 9A illustrates protocol layering for V-MTC-IWF to UE signaling (T8a), while FIG. 9B illustrates protocol layering for V-MTC-IWF to UE signaling (T8b). As shown, the Device trigger application PDU may be carried in a generic container between the MME/SGSN and the UE. Moreover, the application PDU may be a generic Application Data Container which is transferred to the MTC Application on the UE. The application PDU may be transparent to CN entities (MME/SGSN).

Figure 10:
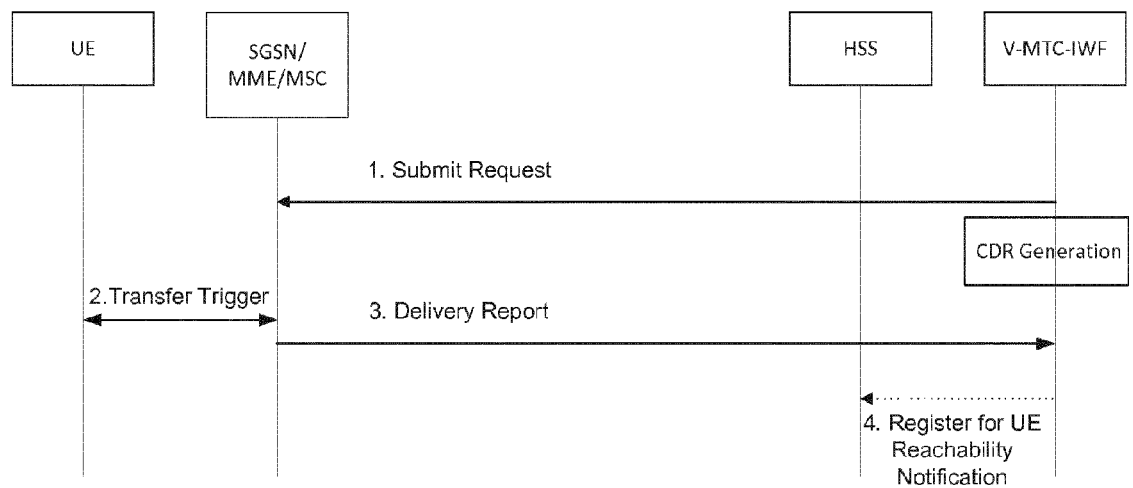
FIG. 10 illustrates a further call flow according to certain embodiments.

FIG. 10 illustrates a T8a/T8b/T8c Trigger Delivery Flow according to certain embodiments. As shown in FIG. 10, at 1, the V-MTC-IWF may use the UE capabilities, serving CN node(s) capabilities retrieved from the HSS to select a suitable serving CN node (for example MME, SGSN or MSC) capable of triggering in a generic format. The V-MTC-IWF may send a Submit Request (IMSI, message priority, V-MTC-IWF ID, reference number, single delivery attempt flag (optional), validity time (optional), Request type (trigger application), application PDU) to the serving CN node. This may, for example, involve sequential or parallel delivery attempts in SGSN, MSC and/or MME. In a roaming scenario an H-MTC-IWF may perform the HSS query (not shown in this figure) and may route the trigger request to the V-MTC-IWF (not shown).

At 2, the serving CN node may indicate the Request type (trigger application) in the container type, application PDU in a generic container, V-MTC-IWF ID, and reference number within the NAS message and can deliver it to the UE. The V-MTC-IWF may generate the necessary CDR information for charging. The UE may provide the contents of the generic container and the container type to the corresponding application.

If the UE is in idle mode, the serving CN node may page the UE prior to sending a NAS message for delivering the trigger. The UE may respond with the delivery status (cause), V-MTC-IWF ID, Reference number, Response type (trigger application) in the container type, and optionally, application PDN in a generic container.

At 3, the serving CN node may send a Delivery Report (Cause, reference number, Response type (trigger application) in the container type, and if received, application PDN in a generic container) to the V-MTC-IWF. The cause may indicate whether the Trigger-Message was successfully delivered to the UE or a reason for failure.

At 4, if the Trigger-Message may not be delivered and validity period may indicate that this is not requesting only a single delivery attempt, the V-MTC-IWF may register with the HSS for UE reachability notification, as discussed above. When V-MTC-IWF is notified of UE reachability, it may re-attempt to deliver the trigger request.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Glossary

IMSI—International Mobile Subscriber Identity
M2M—Machine-to-Machine
MTC—Machine Type Communication
OA&M—Operation, Administration and Maintenance
SIMTC—System Improvements for Machine Type Communication (3GPP Rel-11 work item)
SCS—Services Capability Server
IWF—Interworking Function
V-MTC-IWF—Visited network Machine Type Communication interworking function
H-MTC-IWF—Home network Machine Type Communication interworking function
Ext ID—External Identifier (could be NAI, URI or FQDN)
UE—User Equipment
PLMN—Public Land Mobile Network
FQDN—Fully Qualified Domain Name
DNS—Domain Name System
MNC—Mobile Network Code
MCC—Mobile Country Code
H-PLMN—Home Public Land Mobile Network
V-PLMN—Visited Public Land Mobile Network
MT-SMS—Mobile Terminated Short Message Service

We claim:

1. A method, comprising:
    receiving, from a network element, a request in a visited machine type communication interworking function, the request having been provided by a home machine type communication interworking function;
    processing the request in the visited machine type communication interworking function; and
    sending a response to the network element in response to the request.

2. The method of claim 1, wherein the processing comprises querying a home subscriber server to obtain serving node information based on the request.

3. The method of claim 1, wherein the processing comprises sending a submit request to a serving node based on the request and receiving a submit response from the serving node in response to the submit request.

4. The method of claim 1, further comprising:
    generating charging information in the visited machine type communication interworking function.

5. The method of claim 1, further comprising:
performing at least one security check with respect to the request in the visited machine type communication interworking function.

6. The method of claim 1, further comprising:
determining at least one serving node corresponding to a user equipment identified in the request, wherein the determining comprises a domain name server query.

7. A method, comprising:
sending a request to a visited machine type communication interworking function from a home machine type communication interworking function;
receiving a response from the visited machine type communication interworking function in response to the request.

8. The method of claim 7, further comprising:
receiving a machine type communication trigger request from a services capability server, wherein the sending the request is responsive to the machine type communication trigger request, and sending a machine type communication response in response to the machine type communication trigger request.

9. The method of claim 7, further comprising:
determining the visited machine type communication interworking function based on at least one of a fully qualified domain name of a node currently serving a user equipment identified in the request, a fully qualified domain name of the visited machine type communication interworking function, or a pre-configured foreign domain visited machine type communication interworking function pair.

10. The method of claim 7, further comprising:
querying a home subscriber server based on the machine type communication request.

11. The method of claim 7, further comprising:
storing a mapping between an international mobile subscriber identity and an external identifier of a user equipment corresponding to the request.

12. The method of claim 1, wherein the request comprises at least one of a device trigger request, a monitoring request, or a small data transmission request.

13. An apparatus, comprising:
at least one processor; and
at least one memory comprising computer program code, wherein the at least one memory and the computer program code are configured to, with the at least one processor, cause the apparatus at least to
receive, from a network element, a request in a visited machine type communication interworking function, the request having been provided by a home machine type communication interworking function;
process the request in the visited machine type communication interworking function; and
send a response to the network element in response to the request.

14. The apparatus of claim 13, wherein the apparatus is a machine type communication interworking function configured as a visited machine type communication interworking function.

15. An apparatus, comprising:
at least one processor; and
at least one memory comprising computer program code, wherein the at least one memory and the computer program code are configured to, with the at least one processor, cause the apparatus at least to
send request to a visited machine type communication interworking function from a home machine type communication interworking function; and
receive a response from the visited machine type communication interworking function in response to the request.

16. The apparatus of claim 15, wherein the apparatus is a machine type communication interworking function configured as a home machine type communication interworking function.

17. The apparatus of claim 15, wherein the request comprises at least one of a device trigger request, a monitoring request, or a small data transmission request.

18. A system, comprising:
a home machine type communication interworking function comprising at least one first processor and at least one first memory comprising first computer program code, wherein the at least one first memory and the first computer program code are configured to, with the at least one first processor, cause the home machine type communication interworking function at least to send request to a visited machine type communication interworking function and receive a response from the visited machine type communication interworking function in response to the request; and
the visited machine type communication interwork function comprising at least one second processor and at least one second memory comprising second computer program code, wherein the at least one second memory and the second computer program code are configured to, with the at least one second processor, cause the visited machine type communication interworking function at least to receive, from the home machine type communication interworking function, the request, process the request, and send the response to the home machine type communication interworking function in response to the request.

19. A computer program product comprising a non-transitory computer readable medium encoded with instructions that, when executed in hardware, perform a process, the process comprising the method of claim 1.

* * * * *